Patented Aug. 28, 1945

2,383,817

UNITED STATES PATENT OFFICE 2,383,817

ORGANOSILICON COMPOUNDS

Eugene G. Rochow, Schenectady, N. Y., assignor to General Electric Company, a corporation of New York No Drawing. Original application April 30, 1940, Serial No. 332,606. Divided and this application March 24, 1942, Serial No. 435,938

7 Claims. (Cl. 260—2)

This invention relates to new compositions of matter and more particularly to new and useful organo-silicon compounds. Specifically, the invention is concerned with the production of organo-silicon compounds in which a plurality of divalent organic radicals are each linked to two separate (different) silicon atoms. This application is a division of my copending application Serial No. 332,606, filed April 30, 1940, and assigned to the same assignee as the present invention. The claims in the present application are directed to organo-silicon compounds of the designated type in which some of the organic radicals are replaced by oxygen.

Compounds of silicon, oxygen, and divalent organic radicals heretofore have been known. Bygden (Berichte, 48, 1236, 1915, and Dissertation Upsala, 1916, 105-107) prepared pentamethylene silicone, $[(CH_2)_5SiO]_x$, by hydrolysis of pentamethylene silicon di-chloride to the corresponding silicol which, when dehydrated, yielded the silicone. This material is a substituted silicon oxide and is solid and polymeric by virtue of the —Si—O—Si—O— network. In polymeric pentamethylene silicon, the pentamethylene radicals are attached to the silicon atoms in this manner:

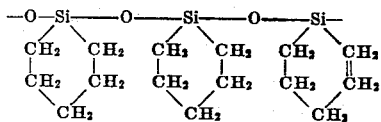

As will be seen from the above formula, each divalent pentamethylene radical is attached to a single silicon atom.

In marked contrast with the known pentamethylene silicone, the new compounds of this invention are polymeric bodies in which a large number of silicon atoms are linked to one another by divalent (double-ended) organic radicals in this manner:

(A)

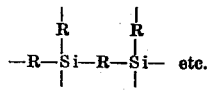

In the above formula, which for purposes of clarity has been shown as a doubling of the unit structure, (B)

R represents any divalent organic radical capable of being linked through each of its two valences to separate silicon atoms. For instance, when R in Formula A represents an aromatic radical, specifically a phenylene radical, the polymers of this invention contain the structure (C)

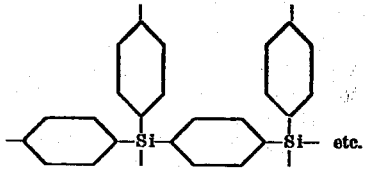

The formula designated as (C) also may be written as (D)

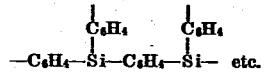

Similarly, when R in Formula A represents a saturated aliphatic radical such as a methylene or poly-methylene radical, specifically —CH$_2$—, the polymers of this invention contain the structure (E)

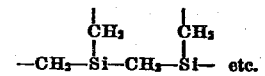

Illustrative examples of other divalent organic radicals which R in Formulas A and B may be are dimenthylene, —(CH$_2$)$_2$—, trimethylene, —(CH$_2$)$_3$—, tetramethylene, —(CH$_2$)$_4$—, pentamethylene, —(CH$_2$)$_5$—, hexamethylene, —(CH$_2$)$_6$—, or in general any aliphatic straight chain radical of the general type, —(CH$_2$)$_x$, where $x$ is any integer, for example from 1 to 20 or more. Other examples of divalent organic radicals which R may be are p,p'-diphenylene,

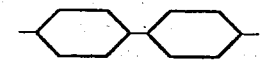

the aliphatic branched chain radicals, for instance methyl methylene

dimethyl methylene, —C(CH$_3$)$_2$—, 2,3 dimethyl tetramethylene,

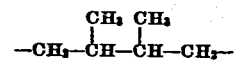

etc.; alkyl-substituted aryl radicals, e. g. substituted phenylene radicals of the general type, —C$_6$H$_3$R'—, where R' is any alkyl or aralkyl substituent radical; aryl-substituted alkyl radicals, e. g., substituted radicals of the general type,

where R" is any aryl or alkaryl radical. More specific examples of radicals which R' and R" may be are given hereafter with particular reference to monovalent organic radicals.

In the polymeric bodies described by Formula A the divalent organic radicals designated generally as R need not all be the same. For example one R may be —$(CH_2)_x$— and another R may be an aliphatic branched chain divalent radical, e. g. methyl methylene, a substituted or unsubstituted phenylene radical, a polymethylene radical, etc. A more specific example of this type of compound is one containing approximately an equal number of pentamethylene and phenylene radicals bonded to silicon atoms. In such a polymer the silicon atoms and divalent organic radicals are bonded together in the following random manner:

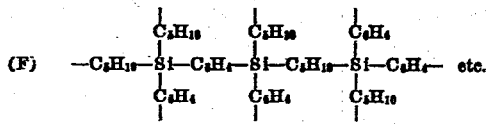

By introducing different divalent organic radicals into the organo-silicon compounds of this invention, the properties of the polymeric body may be altered as desired or as conditions may require.

Organo-silicon compounds consisting of a plurality of monovalent and divalent organic radicals linked to silicon atoms may also be produced in accordance with my invention. Such compounds differ from those represented by Formulas A and B in that some of the divalent organic radicals (R in the formulas) have been replaced by monovalent organic radicals, e. g., alkyl, aryl, alkaryl, aralkyl, etc., radicals. Polymers of this type contain the structure

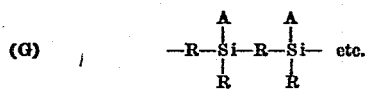

where R represents the same or different divalent organic radicals and A represents the same or different univalent organic radicals. From this formula it will be seen that if the divalent radicals are replaced by twice the number of monovalent radicals to yield a product having the structure

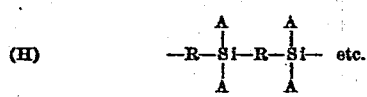

a linear polymer incapable of cross-linking, that is, incapable of forming a three-dimensional network, is obtained. In these compounds of silicon with monovalent and divalent organic radicals, the average number of monovalent radicals should not be greater, and preferably is less, than twice the average number of divalent radicals. By proportioning the reactants so that the average number of monovalent radicals is less than twice the average number of divalent radicals, cross-linking can take place during polymerization of the compound to yield a more rigid structure. Illustrative examples of monovalent organic radicals which A in the above formulas may be are methyl, ethyl, propyl, isopropyl, butyl, isobutyl, amyl, hexyl, heptyl to octadecyl and higher in the aliphatic series; halogenated and nonhalogenated aryl radicals, e. g. phenyl, mono- and polyalkyl phenyl as for instance tolyl, xylyl, mono-, di- and tri-ethyl phenyl, also naphthyl, alkyl naphthyl, (e. g., methyl naphthyl), tetrahydronaphthyl, anthracyl, benzyl, etc.

Organo-silicon compounds formed of divalent organic radicals linked to silicon (or formed of monovalent and divalent organic radicals linked to silicon) and wherein some of the organic radicals have been replaced by oxygen also may be produced in accordance with this invention. In such modifications the number of oxygen atoms should not be greater than an average of one for each two silicon atoms, that is, the number of oxygen atoms should not exceed one-half oxygen per silicon atom. Polymers of this type contain, for example, the structures

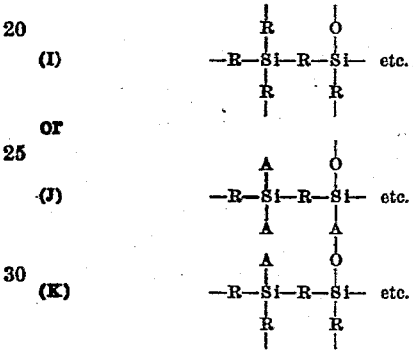

where A and R have the meanings above given.

Any suitable method may be employed in preparing my new compositions comprising an organo-silicon compound in which a plurality of divalent organic radicals are each linked to two different silicon atoms. For instance, such compounds may be prepared by effecting reaction between a silicon halide (e. g., silicon tetrachloride, silicon tetrabromide, etc.) and at least two molecular equivalents of the di-magnesium derivative of the di-halides (e. g., di-chlorides, di-bromides and di-iodides) of divalent organic radicals such as above named by way of example.

In order that those skilled in the art better may understand how the present invention may be carried into effect, the following illustrative examples thereof are given:

*Example 1*

This example illustrates a method of preparing a polymeric body of the type represented by Formula A and, specifically, Formula F. The method of preparation was as follows:

1. One and sixty-five hundredths (1.65) mols of p-dibrombenzene in ether solution was caused to react with 3.45 mols magnesium, resulting in a two-phase system containing 1.32 mols of phenylene di-magnesium bromide:

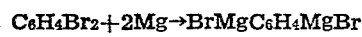
$C_6H_4Br_2 + 2Mg \rightarrow BrMgC_6H_4MgBr$

2. The solution of phenylene di-magnesium bromide was added slowly, with stirring, to an ether solution of 1.32 mols of silicon tetrachloride and the reaction mixture was heated under reflux for 30 minutes, yielding a phenylene silicon dichloride:

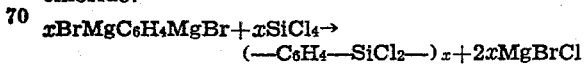
$xBrMgC_6H_4MgBr + xSiCl_4 \rightarrow$
$(—C_6H_4—SiCl_2—)_x + 2xMgBrCl$ 3. One and thirty-two hundredths (1.32) mols of the di-magnesium derivative of mixed isomeric dichlorpentanes in ether solution were then added, with stirring, to the reaction mixture of step 2, and the resulting mass was heated under reflux for 2 hours.

$(-C_6H_4-SiCl_3-)_x + xC_6H_{10}MgCl_2 \longrightarrow$

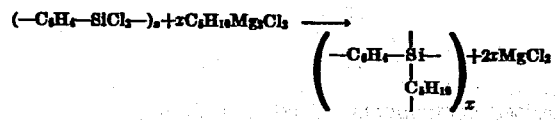

4. The solution of organo-silicon compound was isolated by pouring the entire reaction mass into water, thereby dissolving out the magnesium salts. Most of the ether was evaporated to yield an extremely viscous, benzene-soluble, yellow resin. Upon evaporation of all the ether there resulted a solid, clear, yellow resin having a nontacky surface.

The product of this example may be described as a reaction product of a silicon halide, specifically silicon tetrachloride, with two molecular equivalents of the di-magnesium derivatives of two organic di-halides, specifically a di-chloride and a di-bromide.

Example 2

This example illustrates a method of preparing a polymeric body of the type represented by Formula H. The method of preparation was as follows:

The first two steps of the process were essentially the same as those described under steps 1 and 2 of Example 1.

3. An ether solution of methyl magnesium bromide containing 2.1 mols methyl magnesium bromide per mol phenylene silicon di-chloride was added slowly, with stirring, to the reaction mass resulting from step 2.

$(-C_6H_4-SiCl_2-)_x + 2xCH_3MgBr \longrightarrow$

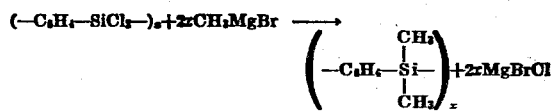

4. The solution of methyl phenylene silicon was isolated by pouring the entire reaction mass into water, thereby dissolving out the magnesium salts. The ether layer was separated and washed free of magnesium salts. The removal of the ether left a brown, sticky resin which melted at approximately 100° C. It was insoluble in alcohol, but soluble in benzene and acetone. Heating for 5 hours at 230° C. did not solidify the molten resin nor cause any apparent physical change.

The product of this example may be described as a reaction product of a silicon halide with one molecular equivalent of the di-magnesium derivative of an organic di-halide and slightly more than two molecular equivalents of the magnesium derivative of an organic mono-halide.

Example 3

This example illustrates a method of preparing a polymeric body of a type similar to that represented by Formula J. The method of preparation was as follows:

The first two steps of the process were essentially the same as those described under steps 1 and 2 of Example 1.

3. An ether solution of methyl magnesium bromide containing 1.26 mols methyl magnesium bromide per mol phenylene silicon dichloride was added slowly, with stirring, to the reaction mass resulting from step 2. The main reaction is:

$(-C_6H_4-SiCl_2-)_x + xCH_3MgBr \longrightarrow$

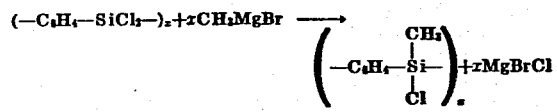

4. The methyl phenylene silicon chloride was hydrolyzed by pouring the reaction mass on cracked ice.

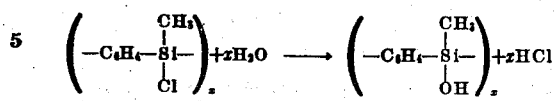

The ether layer containing the hydrolysis product was separated and washed free of acid. Evaporation of the ether yielded a soft, sticky, yellow, resinous material.

5. The product of step 4 was condensed (dehydrated) by heating the material at a gradually increasing temperature to 110° C. After two hours' heating at 110° C. the product was still liquid, but solidified when heated for an additional hour at 120° C. This condensation product was a soft, brown resin. It was soluble in benzene, toluene, and acetone. This resin became infusible on prolonged heating.

If desired, the condensation reaction may be carried out in the presence of a dehydrating agent, e. g., an alkyl borate such as ethyl borate. Illustrative examples of other dehydrating agents which may be employed to accelerate the condensation reaction are disclosed in my copending application Serial No. 332,605, filed April 30, 1940.

The product of this example may be described as a resinous dehydrated product of hydrolysis of the reaction product of more than one and less than two molecular equivalents of the magnesium derivative of an organic mono-halide, specifically 1.26 mols methyl magnesium bromide, with the product of reaction of a silicon halide with one molecular equivalent of the di-magnesium derivative of an organic di-halide, specifically phenylene di-magnesium di-bromide.

It will be understood of course that my invention is not limited to the specific methods shown in the above illustrative examples, nor to the specific reactants and proportions therein shown.

In accordance with this invention chemical compounds consisting of a plurality of monovalent and divalent organic radicals linked to silicon atoms may be prepared by reacting, for example, a solution of a silicon halide with a solution containing one molecular equivalent of the di-magnesium derivative of an organic di-halide, reacting the resulting solution of organo-silicon halide with a solution containing two molecular equivalents of the magnesium derivative of an organic mono-halide, and isolating from the reaction mass the organo-silicon compound thereby produced. In preparing compounds of silicon with divalent organic radicals and oxygen, a suitable method, for example, comprises effecting reaction between a silicon halide and more than 1½ but less than 2 molecular equivalents of the di-magnesium derivative of an organic di-halide, hydrolyzing the resulting product and dehydrating the hydrolyzed product in the presence or absence of an accelerator of condensation, e. g., a dehydrating agent.

As is evident from the above description of the compounds of the present invention, particularly from their method of preparation, the novel compounds are further characterized by the fact that they contain no Si—Si linkages, the silicon atoms being connected to one another by divalent organic radicals or oxygen atoms.

To illustrate how the resinous materials of this invention may be used in industry, the following examples are cited:

A liquid coating composition comprising a volatile solvent and a soluble, heat-hardenable liquid, or a normally solid, resinous polymer, such as above described, is applied to a metallic conductor such as copper wire. Thereafter the coated wire is heated to vaporize the solvent and to harden the polymer. In this way the polymerization of the resin may be continued or completed in situ. In manufacturing certain kinds of electrical cables it may be desirable to wrap the conductor with an organic or inorganic fibrous material such as asbestos, glass, cotton or paper before treating it with the liquid resin. A further procedure is to coat and at least partly impregnate the wrapped conductor with the liquid resin, wind the thus insulated conductor into the desired coil, and then heat the wound coil to solidify the resin.

Sheet insulation may be prepared by treating woven or felted organic fabrics or paper with compositions comprising the herein-described resinous materials. Sheet insulation also may be prepared by binding flaky inorganic substances with these new resins. For example, they may be used in the production of laminated mica products comprising mica flakes cemented and bonded together with the polymerized resin. Self-supporting coherent films or sheets of clay such as bentonite also may be treated to advantage with compositions comprising the polymeric bodies of this invention. Such treated films may be produced as described more fully in, for example, my copending application Serial No. 287,787, filed August 1, 1939.

In addition to their use in the field of insulation, these new resinous compositions also may be used as protective coatings, for instance as coatings for base members such as glass bulbs or other articles of glass, also for coating metals such as iron, steel, copper, etc. They also may be used as sealing compositions in the production of so-called resistance or semi-conducting paints, and for other commercial applications as described more fully in my copending applications Serial Nos. 287,787 and 296,819, filed September 27, 1939, with particular reference to methyl silicones and halogenated aryl silicones.

In certain cases it may be desirable to form mixtures of different polymers of this invention. In other cases, different products capable of being dehydrated or condensed may be mixed and co-condensed to yield resins better adapted for a particular application. However, in such cases the components should be mixed before the condensation of the individual materials has advanced to the point where the bodies are incompatible. For other applications it may be desirable to polymerize or condense the liquid resins to solid form and then mix and grind the materials together to form a composite mass.

The polymerizable or the polymerized resins of this invention also may have incorporated therewith various other materials, for example polymerizable or polymerized silicones. Examples of compounds which thus may be used to modify the resins of this invention are those described in my copending applications Serial Nos. 287,787; 296,819; filed respectively August 1 and September 27, 1939, and in applications Serial Nos. 332,097, 332,098, and 332,099 filed April 27, 1940, all of these applications being assigned to the same assignee as the present invention. Thus, polymerizable compositions may be prepared by mixing polymerizable silicones such for example as polymerizable methyl silicones, halogenated or nonhalogenated aryl silicones, aroxyaryl silicones, methyl aryl silicones, etc. with the herein described polymers or partial condensation products. The resulting polymerizable mixtures then may be polymerized under heat or under heat and pressure, and in the presence or absence of a polymerization catalyst, to obtain products having properties different from the separately polymerized components. Also, if desired, polymeric silicones such as those mentioned above may be suitably compounded with the polymerizable or polymerized resins of this invention. In these and other ways the basic materials of this invention may be modified to provide products having properties best adapted for a particular service application.

The individual copolymerized or mixed liquid, semi-solid or solid silicon-containing resins of my invention may be suitably incorporated into other materials to modify the properties of the latter. For example, they may be compounded with substances such as natural and synthetic rubber; tars, asphalts and pitches, more specific examples of which are wood tars, petroleum asphalts and vegetable pitches, natural resins such as wood rosin, copal, shellac, etc.; synthetic resins such as phenol-aldehyde resins, urea-aldehyde resins, modified and unmodified alkyd resins, cumar resins, vinyl resins, esters of acrylic and methacrylic acids, etc.; cellulosic materials such as cellulose nitrate (pyroxylin), cellulose acetate including the triaceate, cellulose propionate, cellulose butyrate, etc., cellulose ethers such as methyl cellulose, ethyl cellulose, benzyl cellulose, etc. In some cases the hard polymers of this invention may be pulverized and used as fillers for substances such as above mentioned. In other cases, especially when the silicon resin is compatible with the substance with which it is to be incorporated, it may be in the form of a liquid or relatively soft polymer of low molecular weight prior to compounding with the substance to be modified.

These new silicon resins also may be compounded with various other materials. For example, the hard, brittle polymers may be plasticized by the addition of suitable plasticizing materials or the liquid or low-softening-point polymers themselves may be used as plasticizers of other normally brittle substances.

The low molecular weight resinous polymers of this invention also may be dissolved or dispersed in oils, such as linseed oil, Chinawood oil, perilla oil, soya bean oil, etc., alone or mixed with solvents, pigments, plasticizers, driers, and other compounds of coating compositions to yield products which, when applied to a base member and air-dried or baked, have improved heat resistance.

Laminated products may be made by superimposing organic or inorganic fibrous sheet materials coated and impregnated with these new resins and thereafter bonding the sheets together under heat and pressure. Molding compositions and molded articles also may be formed from these new resins. If desired, filling materials such as asbestos, glass fibers, talc, quartz powder, wood flour, etc., may be incorporated into such compositions prior to molding. Shaped articles are formed from such compositions under heat or under heat and pressure in accordance with practices now widely used in the plastics arts.

What I claim as new and desire to secure by Letters Patent of the United States, is:

1. A polymeric organo-silicon compound comprising oxygen atoms and divalent aromatic radicals linked to silicon atoms, the said compound containing no Si—Si linkages each of a plurality of said oxygen atoms and divalent aromatic hydrocarbon radicals being linked to two different silicon atoms, the oxygen atoms in said compound not exceeding an average of one for each two silicon atoms.

2. A composition comprising a resinous organo-silicon compound containing no Si—Si linkages and consisting of monovalent hydrocarbon radicals, divalent aromatic hydrocarbon radicals and oxygen atoms linked to silicon atoms, each of a plurality of the divalent hydrocarbon radicals and oxygen atoms linking two different silicon atoms, the said oxygen atoms in said compound not exceeding an average of one for each two silicon atoms, the said monovalent radicals being selected from the class consisting of saturated aliphatic hydrocarbon radicals and aromatic hydrocarbon radicals.

3. The method of preparing a chemical compound consisting of a plurality of oxygen atoms, monovalent hydrocarbon radicals and divalent aromatic hydrocarbon radicals linked to silicon atoms which comprises reacting a solution of a silicon tetrahalide with a solution containing one molecular equivalent of the di-magnesium derivative of dihalogenated aromatic hydrocarbon, reacting the resulting solution of organo-silicon halide with a solution containing more than one but less than two molecular equivalents of the magnesium derivative of a monohalogenated hydrocarbon selected from the class consisting of saturated aliphatic hydrocarbon and aromatic hydrocarbons, hydrolyzing the resulting product and dehydrating the hydrolyzed product.

4. A polymer comprising oxygen atoms and phenylene radicals linked to silicon atoms, each of a plurality of the oxygen atoms and phenylene radicals being linked to two different silicon atoms, the said polymer containing no Si—Si linkages, the number of oxygen atoms in the said polymer not exceeding an average of one for each two silicon atoms.

5. A polymer consisting of methyl radicals, phenylene radicals and oxygen atoms linked to silicon atoms, each of a plurality of the phenylene radicals and oxygen atoms linking two different silicon atoms, the said polymer containing no Si—Si linkages, the said oxygen atoms in said polymer not exceeding an average of one for each two silicon atoms.

6. A polymeric compound consisting of monovalent saturated aliphatic hydrocarbon radicals, phenylene radicals and oxygen atoms linked to silicon atoms, each of a plurality of the phenylene radicals and oxygen atoms being linked to two different silicon atoms, the said compound containing no Si—Si linkages, the oxygen atoms in said compound not exceeding an average of one for each two silicon atoms.

7. A polymeric compound consisting of methyl radicals, divalent aromatic hydrocarbon radicals and oxygen atoms linked to silicon atoms, each of a plurality of the divalent aromatic hydrocarbon radicals and oxygen atoms being linked to two different silicon atoms, the said compound containing no Si—Si linkages, the oxygen atoms in said compound not exceeding an average of one for each two silicon atoms.

EUGENE G. ROCHOW.

Certificate of Correction

Patent No. 2,383,817.  August 28, 1945.

EUGENE G. ROCHOW.

It is hereby certified that errors appear in the printed specification of the above numbered patent requiring correction as follows: Page 1, first column, line 31, in the formula, strike out the double bond in the last portion thereof and insert instead a single bond; and second column, line 2, for "valences" read *valencies;* lines 17 to 21 inclusive, strike out the formula and insert instead the following:

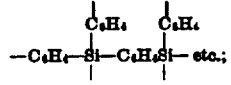

lines 28 to 30 strike out the formula and insert instead the following:

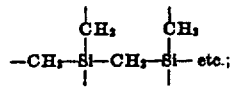

and line 33, for "dimenthylene" read *dimethylene;* page 2, first column, lines 45 to 48 inclusive, strike out the formula and insert instead the following:

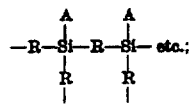

page 3, second column, line 27, for "Seriai" read *Serial;* and that the said Letters Patent should be read with these corrections therein that the same may conform to the record of the case in the Patent Office.

Signed and sealed this 25th day of December, A. D. 1945.

[SEAL]

LESLIE FRAZER,
*First Assistant Commissioner of Patents.*